UNITED STATES PATENT OFFICE 2,381,599

TRISAZO DYESTUFFS, THEIR COPPER COMPOUNDS, AND THEIR MANUFACTURE

Adolf Krebser, Riehen, near Basel, and Werner Bossard, Basel, Switzerland, assignors to J. R. Geigy A. G., Basel, Switzerland No Drawing. Application October 28, 1941, Serial No. 416,900. In Switzerland August 2, 1940

6 Claims. (Cl. 260—173)

It has been found that valuable copperable trisazodyestuffs are obtained by coupling the tetrazo compound of a diamine containing 2 benzene nuclei which are linked by a member of the class consisting of —NH—CO— and —NH—CO—NH— only on one half side with an o-hydroxyphenyl carboxylic acid, then combining the obtained diazoazo compound with an amine or an amino sulphonic acid of the naphthalene series coupling in para-position, and containing in or-thoposition to the diazotable amino group a substituent capable of forming metal complex compounds, further diazotising the amino disazo dyestuff, coupling the latter with a N-acyl-substitution product of the 2-amino-6-hydroxynaphthalene-8-sulphonic acid and converting the trisazo dyestuff, according to usual methods, in substance or on the fiber into the copper complex compounds.

Instead of the tetrazo compound of the diamine mentioned above, there may be used as well (as is known) mono-diazotised compounds of suitable derivatives of the diamines, for example of compounds which contain one free and one acylated amino group or nitro group. After the coupling with the o-hydroxy-carboxylic acid of the benzene series, the second free amino group is produced (for example by saponification of an acylamino group, reduction of a nitro group and so on), and diazotised, whereafter coupling with the second component is effected.

The new trisazodyestuffs correspond to the following formula

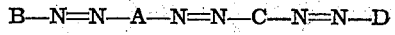

B—N=N—A—N=N—C—N=N—D wherein A stands for the radical of a tetrazotised diamine containing two benzene nuclei which are linked by a member of the class consisting of —NH—CO— and —NH—CO—NH—, B stands for the radical of an ortho-hydroxy-carboxylic acid of the benzene series, C stands for the radical of a diazotized 1-amino-2-naphtholether which may be substituted by a sulphonic acid group in the 6- or 7-position, and D stands for the radical of a 2-acylamino-6-naphthol-8-sulphonic acid.

The new dyestuffs possess, also when coppered, substantive properties and dye green to olive shades which are distinguished by a remarkable fastness to light. If desired, the new dyestuff-copper compounds can also still be further coppered on the fibre.

The following example illustrates the invention, the parts being by weight.

EXAMPLE 24.1 parts of 4.4'-diamino diphenyl urea are, as known, diazotised and coupled at 0° C. at one side with 14 parts of salicylic acid in the presence of magnesia. Then it is made acid to litmus by means of hydrochloric acid and further coupled in acetic acid condition with 25.3 parts of 1-amino-2 - hydroxynaphthalene methylether-6-sulphonic acid. The disazo dyestuff is, in acid condition, isolated, dissolved in 1500 parts of water and caustic soda lye, mixed with 7.5 parts of sodium nitrite and diazotised by pouring thereinto at 5° C. 80 parts of concentrated hydrochloric acid. The diazonium compound filtered off is suspended in ice-water and then coupled at 0° C. with 28.1 parts of 2-acetylamino-6-hydroxynaphthalene-8-sulphonic acid which has been dissolved in 200 parts of water with 200 parts of pyridine and 20 parts of sodium carbonate. The finished dyestuff is salted out, filtered and dried in vacuo. It dyes cotton from the Glauber's salt bath in green shades which are transformed, by after-treatment with copper salts on the fibre, into a fast olive-green.

A number of further examples are enumerated in the following table.

Table

| A | B | C | D | Properties | |
|---|---|---|---|---|---|
| | | | | Coloration directly on cotton | Coloration of the copper complex compound or after-coppered on the fibre |
| 1.4-diaminobenzene | Salicylic acid | 1-amino-2-hydroxynapthalene-methylether-6-sulphonic acid. | 2-benzoylamino-6-hydroxy-napthalene-8-sulphonic acid. | Green | Greenish-grey. |
| 4.4'-diaminodiphenylurea | m-Cresotinic acid | ____do____ | 2-acetylamino-6-hydroxy-napthalene-8-sulphonic acid. | ____do____ | Olive-green. |
| 1.3-diaminobenzene | Salicylic acid | 1-amino-2-hydroxynapthalene ethylether-7-sulphonic acid. | ____do____ | Blue-green | Green. |
| (N)-3'-aminobenzoyl-1.4-diaminobenzene. | ____do____ | 1-amino-2-hydroxy-napthalene methylether-6-sulphonic acid. | ____do____ | ____do____ | Do. |
| 1.4-diaminobenzene-2-sulphonic acid. | ____do____ | 1-amino-2-hydroxynapthalene ethyl-ether. | ____do____ | Green | Grey. |
| 1.3-diaminobenzene | ____do____ | 1-amino-2-hydroxynapthalene methylether-6-sulphonic acid. | 2-maleinylamino-6-hydroxy-naphthalene-8-sulphonic acid. | Olive green | Green. |
| 1.4-diaminobenzene | o-Cresotinic acid | ____do____ | 2-chloroacetylamino-6-hydroxynapthalene-8-sulphonic acid. | Grey | Olive. |
| (N)-4'-aminobenzoyl-1.4-diaminobenzene-2-sulphonic acid. | Salicylic acid | ____do____ | 2-benzoylamino-6-hydroxy-napthalene-8-sulphonic acid. | Blue-green | Green. |

What we claim is:
1. The trisazo dyestuffs having in the free state the following formula:

$$B-N=N-Bz-X-Bz-N=N-C-N=N-D$$
$$\phantom{B-N=N-Bz-X-Bz-}(1)\phantom{-N=N-}(2)$$

wherein each Bz stands for a benzene nucleus, X stands for a member of the group consisting of —NH—CO— and —NH—CO—NH—, an —NH— of the member X being connected to Bz (2), B stands for the radical of an ortho-hydroxy-carboxylic acid of the benzene series, C stands for the radical of a member of the group consisting of a diazotised 1-amino-2-naphtholether-6-sulphonic acid and a diazotised 1-amino-2-naphthol-ether-7-sulphonic acid, and D stands for the radical of a 2-acylamino-6-naphthol-8-sulphonic acid, being in form of their sodium salts dark powders, soluble in water and, in combination with a copper yielding compound, dyeing cotton generally from green to olive shades of good fastness properties.

2. The trisazo dyestuffs of the formula

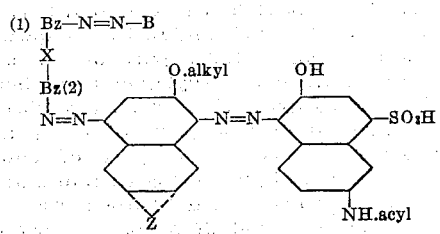

wherein each Bz stands for a benzene nucleus, X stands for a member of the group consisting of —NH—CO— and —NH—CO—NH—, an —NH— of the member X being connected to Bz(2), B stands for the radical of an ortho-hydroxy-carboxylic acid of the benzene series, and Z stands for a member of the group consisting of H and SO₃H, being in form of their sodium salt dark powders, soluble in water, dyeing, when coppered, cotton green to olive shades of good fastness properties to light.

3. The trisazo dyestuffs having in the free state the following formula

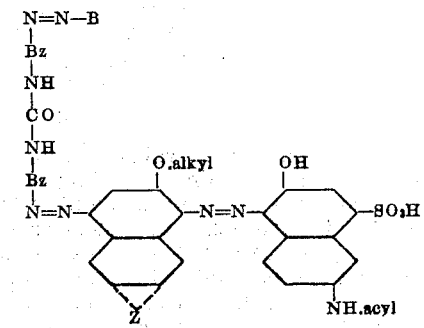

wherein each Bz means a benzene nucleus, B stands for the radical of an ortho-hydroxy-carboxylic acid of the benzene series, and Z stands for a member of the group consisting of H and SO₃H, being in form of their sodium salts dark powders, soluble in water, dyeing, when coppered, cotton green to olive shades of good fastness properties to light.

4. The trisazo dyestuff having in the free state the following formula

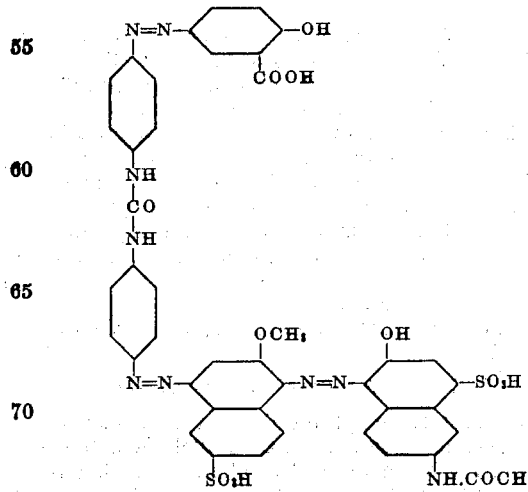

being in form of the sodium salt, a dark powder dyeing cotton green shades which, on coppering, 5. The trisazo dyestuffs having in the free state the following formula

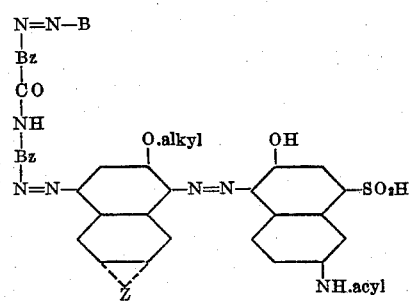

wherein each Bz means a benzene nucleus, B stands for the radical of an ortho-hydroxy-carboxylic acid of the benzene series and Z stands for a member of the group consisting of H and $SO_3H$, being in the form of their sodium salts dark powders, soluble in water, dyeing, when coppered, cotton green shades of good fastness properties.

6. The trisazo dyestuff having in the free state the following formula

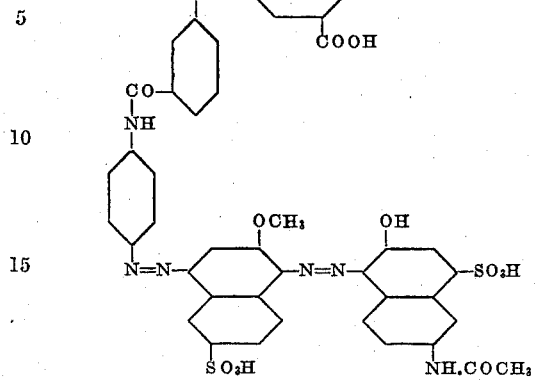

being in form of the sodium salt a dark powder soluble in water, dyeing, when coppered, cotton green shades of good fastness properties.

ADOLF KREBSER.
WERNER BOSSARD.